H. Mellish,
Lancet,
N° 12,636. Patented Apr. 3, 1855.
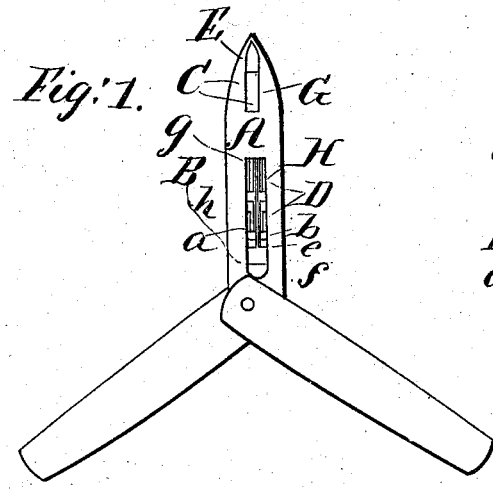
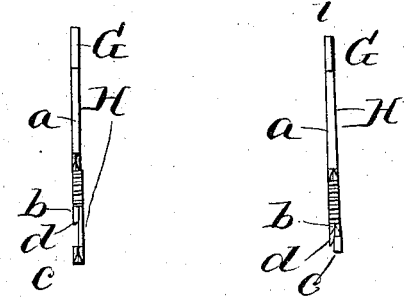
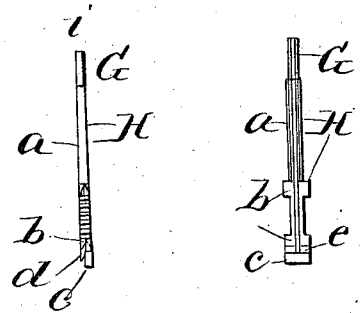
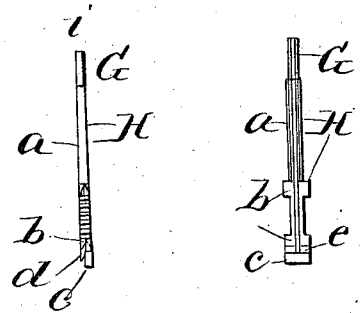
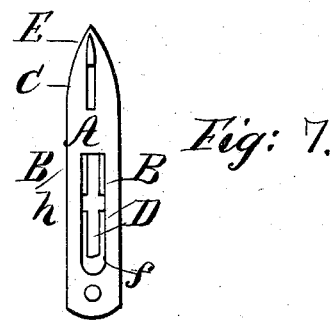
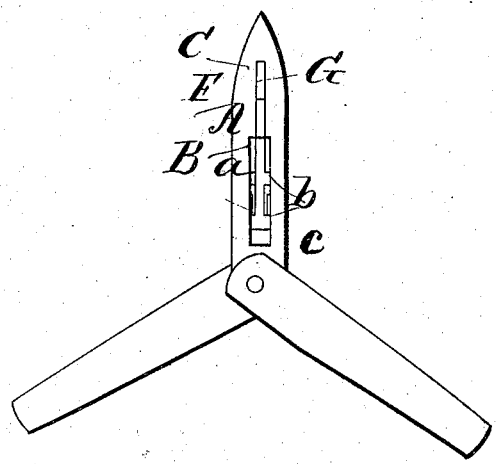
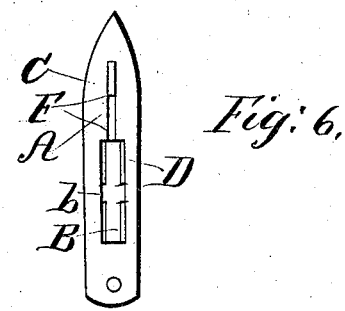

UNITED STATES PATENT OFFICE.

HENRY MELLISH, OF WALPOLE, NEW HAMPSHIRE.

LANCET.

Specification of Letters Patent No. 12,636, dated April 3, 1855.

*To all whom it may concern:*

Be it known that I, HENRY MELLISH, of Walpole, in the county of Cheshire and State of New Hampshire, have invented a new and useful Improvement in Lancets for Vaccinating; and I do hereby declare that the following is a full and exact description thereof, reference being had to the accompanying drawings and to the letters of reference marked thereon.

The nature of my invention consists in arranging a charger and piston in the blade of a lancet in such a manner that when, having made a puncture for the deposit of matter, by holding the lancet in the usual manner for that purpose, the matter may be deposited before the instrument is withdrawn from the puncture, merely by pressing the finger upon the guide of the piston and slipping it and the charger, toward the point of the lancet.

Figure I is a side view of the lancet. Fig. II is a view of its opposite side. Fig. III is a plan or side view of the charger containing its piston. Fig. IV is an edge view of the same showing the guide of the piston out of line with the charger. Fig. V is also an edge view of the same, showing the guide of the piston in line with the charger, and drawn back. Fig. V is a side or plan view of the balde of the lancet showing its slots, ways, and channels. Fig. VII is a reversed view of the same.

A, Fig. I, is the blade of the lancet. See manner of construction at Figs. VI and VII, where B is a slot along its center with the ways D at its edges, for the ways $b$ of the charger G, and the guide $c$ of the piston H, to slide on. C is a slot, and E, Fig. VII, is a recess or channel in which the tubular portion G of the charger slides, see Fig. I. F, Fig. VI, is also a channel, but in the opposite side of the blade, in which the shaft $a$ of the charger slides, see Fig. II.

See construction of piston and charger at Figs. III and V. In Fig. III, G, is the tubular portion of the charger, in connection with its shaft $a$ and guides $b$, with the shaft H of the piston in a channel in one side of the shaft $a$ of the charger and extending in to its tubular portion G. C is the guide of the piston.

Figs. IV and V are edge views of the charger and piston, showing the channels in the edges of the guides $b$ of the charger and the guide $c$ of the piston to fit the ways D in the lsot B, and also showing at Fig. V the lip $d$, with its beveled edge in connection with the guide $b$ of the charger for the purpose of throwing the guide out of line with the piston guide when the piston is moved forward in the charger to discharge the matter, as will hereafter be described, and as may be seen at $d$, Fig. IV.

Now, it may be seen that when the charger and piston, as seen at Fig. III, are placed in the slots and channels of the blade, as seen at Fig. I, with their guides upon the ways D of the slot B, and the lip $d$ on the guide $c$ of the piston, are brought together on the ways, the main body of the charger guide $b$, and the guide $c$ of the piston will stand apart, as seen at $e$, Figs. I and III, the edge only of the lip $d$, coming in contact with the guide $c$ of the piston. Therefore, as the tube and channel of the charger are equal in length to that of the piston rod H, it will be seen that the piston rod does not fill the charging tube to its extreme end by a distance equal to the space $e$, between the guide $b$ of the charger and the guide of the piston, thus leaving a cavity at the end of the tube to contain the matter.

*Operation.*—To charge the instrument with solid matter, slip its charger out to the point of the blade, with the piston drawn back, as seen at Fig. V, or at Fig. III, with only the space $e$ between the guide $b$ of the charger and the guide $c$ of the piston; then, take the charging tube G, at the slot C, between the thumb and fingers, holding it fast, and press it upon the matter, by which means the matter will be taken up by the tube, then draw the guide $c$ of the piston with the charger back in the slot B to the recess $f$, see Fig. I. Now, the lancet should be taken hold of with the thumb and first two fingers, having the first finger on the guide $c$ of the piston, and over the recess $f$ in the blade of the lancet, and make a puncture as is usually done for the purpose of vaccinating, and while the point of the lancet is yet in the puncture, press the first finger upon the guide $c$ of the piston, and slip it, with the charger, toward the point of the lancet until one of the guides $b$ of the charger comes in contact with the end $g$ of the slot B, when the guide $b$ at the end of the charger will have run off its ways into the space $h$, where the ways are discontinued, and at which instant the guide $c$ of the piston will act upon the beveled lip *d* of the charger, and throw it out of line with the piston, as seen at *b*, Fig. IV, and the end of the piston will present at the end of the charging tube, as seen at *i*, Fig. IV, and the matter will be forced from the charger into the puncture.

To charge the instrument with liquid matter, its parts should be arranged as they are left at the end of the operation just described or with the charger and piston shoved out at the end of the lancet as far as they will go, then dip their points into the liquid and move back the piston and charger as in the case of charging with solid matter.

I do not claim the combination of a piston and charger as such, for the purpose of depositing vaccine or other matter; but I do claim—

The construction of a lancet in combination with a charger and piston inside its blade, substantially as above described, for the purpose of depositing vaccine or other matter in a puncture made for that purpose, before the lancet is withdrawn.

HENRY MELLISH.

Witnesses:
 JAMES WM. MELLISH,
 ANDREW J. FISHER.